W. M. DICKINSON.
FLEXIBLE CONDUIT.
APPLICATION FILED DEC. 1, 1919.

1,365,306.

Patented Jan. 11, 1921.

INVENTOR.
William M. Dickinson
BY Booth & Booth
ATTORNEYS.

UNITED STATES PATENT OFFICE.

WILLIAM M. DICKINSON, OF SAN FRANCISCO, CALIFORNIA.

FLEXIBLE CONDUIT.

1,365,306.  Specification of Letters Patent.  Patented Jan. 11, 1921.

Application filed December 1, 1919. Serial No. 341,736.

*To all whom it may concern:*

Be it known that I, WILLIAM M. DICKINSON, a citizen of the United States, residing at the city and county of San Francisco and State of California, have invented certain new and useful Improvements in Flexible Conduits, of which the following is a specification.

My invention relates to flexible conduits of the metallic type.

The object of my invention is to provide a flexible conduit having sufficient strength to enable it to withstand considerable pressure both from within and from without, and at the same time having an impervious and smooth interior capable of resisting the abrasive action of fluids flowing through the conduit. This renders my conduit peculiarly well suited for use in the mud-lines of rotary well-boring machinery, where the fluid carries considerable abrasive material, and where, on account of the length of the pipe-line and the weight and inertia of the column of fluid therein, a vacuum is created in the upper portion of the line, whenever the pump is shut down, which has a tendency to cause the flexible portions of the line to collapse. In fact, it has been demonstrated in actual practice that flexible non-metallic conduit, or hose, will not stand the exterior pressure when used in this connection, and soon breaks down, necessitating the stopping of the drilling operation, with consequent financial loss. Flexible metallic conduit is also impracticable on account of its rough interior, which causes it to be rapidly worn out by the abrasive action of the mud.

It is to be understood, however, that my conduit is not restricted to the above described use, but that it may be employed wherever a flexible conduit is necessary or desirable.

The above related object of my invention is attained by providing, broadly speaking, an impervious, flexible, and preferably nonmetallic and smooth surfaced lining in a flexible metallic shell, with means for securely fastening said lining within said shell, said means forming also coupling members for providing readily separable joints in the conduit.

A more complete description of the invention will be set forth hereinafter, with reference to the accompanying drawings, wherein.

Figure 1:
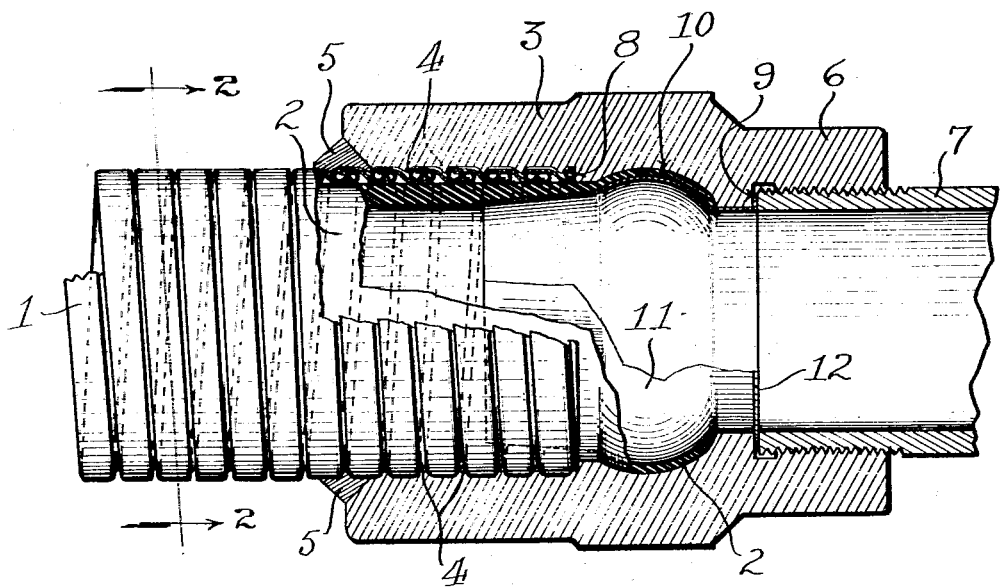
Figure 1 is a broken longitudinal section of my conduit and the coupling members therefor.
Figure 2:
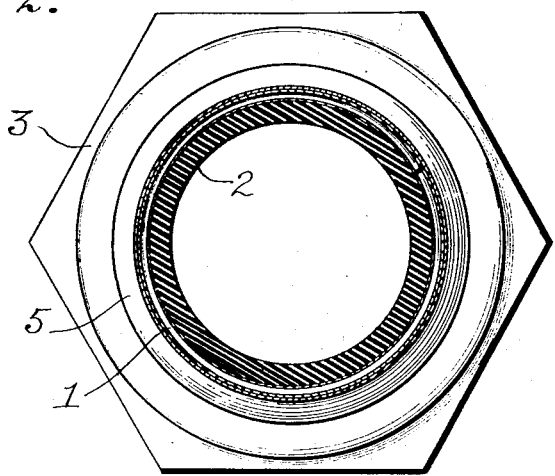
Fig. 2 is a transverse section taken in the direction of the arrows on the line 2—2 of Fig. 1.

In the drawings, the reference numeral 1 designates a shell comprising a flexible metallic conduit of the helical type, formed in any well-known manner. I have illustrated, as an example, a flexible metallic conduit formed by the interengagement of the over-lapping flanged edges of a helically directed strip, but it is to be understood that the construction of said metallic conduit shell forms no part of the present invention, and that any flexible metallic conduit having the requisite mechanical characteristics may be used.

Within the metallic shell 1, I place a close-fitting non-metallic lining 2, formed of any suitable material, preferably superposed alternate layers, vulcanized as a whole, of rubber and rubberized woven cotton fabric, to the number required to give the necessary strength and length of life, the object of this lining being to present an impervious and smooth surface to the material passing through the conduit.

At the ends of my conduit I provide a structure which serves both as a coupling and to unite the metallic and non-metallic members securely together in order to insure against the loosening of the lining and the working in of any material between said lining and the metallic shell. A coupling member 3 is formed with one end portion interiorly threaded, as at 4, to engage the helical groove in the outside of the metallic shell 1, so that said coupling member may be screwed upon said shell. The coupling member 3 and the shell 1 are further united by a ring of solder 5 applied at the end of the threaded portion of said coupling member.

The other end 6 of the member 3 is also interiorly threaded to receive the other member of the coupling, which in this case is shown as a pipe 7, the separable connection being at this point. The coupling member 3 is interiorly shouldered at 8, to abut against the end of the metallic shell 1, and also at 9 to abut against the end of the pipe 7, and between these shoulders is a semi-spherical concave portion 10, into which the end of the lining 2 extends. A relatively thin metallic sleeve or thimble 11 is inserted in the coupling member 3, extending into the lining 2, of the flexible shell 1, and is then expanded, while in this position, to bear firmly against said lining 2 and to clamp the same between itself and the concave portion 10 of the coupling member; and the end 12 of said thimble 11 is flanged outwardly to lie between and be gripped by the shoulder 9 and the abutting end of the pipe 7. There is thus provided a smooth unbroken interior surface through the coupling, the edge of the thin metallic thimble 11 being easily embedded in the non-metallic lining 2 during the expanding process, and at the same time, the end of said lining 2 is securely covered to prevent the intrusion of foreign matter between it and the shell 1.

The non-metallic lining 2 is readily renewable, by removing the thimble 11 and the ring of solder 5, and unscrewing the coupling member 3 from the flexible metallic shell 1. The pipe 7 must, of course, be removed first. The lining 2 and the thimble 11, which are the only parts subject to wear, can thus be easily renewed at little expense, so that the cost of keeping the conduit in proper condition is relatively low.

The coupling construction above described is for separably connecting the flexible conduit with a rigid pipe 7. It is obvious, however, that if two sections of flexible conduit are to be coupled together, each section will be provided with coupling members similar to that described, and a short nipple substituted for the pipe 7, said nipple being threaded on each end and screwing into each coupling member.

I claim:

1. A flexible conduit, comprising a metallic shell; a flexible lining within the shell with its end projecting therefrom; a coupling member fitted on the end of the shell and having on its inner surface a circumferential concave portion surrounding the projecting end of the lining; and an expanded metallic thimble clamping the lining within the metallic shell and within the concave portion of the coupling member.

2. A flexible conduit, comprising a metallic shell; a flexible lining within the shell with its end projecting therefrom; a coupling member fitted by one end on the end of the shell, and having an interior shoulder within its other end, and an inner circumferential concave portion back of said shoulder; an expanded metallic thimble clamping the lining within the metallic shell and within the concave portion of the coupling member, said thimble having a flange engaging the shoulder of said coupling member; and a second coupling member fitted to the free end of the first coupling member and clamping the flange of the thimble against the shoulder of said first coupling member.

3. A flexible conduit, comprising a helically wound metallic shell; a coupling member threaded interiorly to screw upon the end portion of said shell, and shouldered interiorly to abut against the end of said shell, and the other end of said coupling member being interiorly threaded and shouldered; a second coupling member upon which said first coupling member is screwed and against which it is shouldered; a concave portion in the interior of said first coupling member between the shoulders thereof; a flexible lining within said shell, the end portion thereof projecting into the concave portion of said coupling member; and a metallic thimble lying within the end portion of said lining and clamping the same into said concave portion of the coupling member, said thimble having an outwardly turned end flange adapted to be clamped between the end of the second coupling member and the shoulder of the first coupling member co-acting therewith.

In testimony whereof I have signed my name to this specification in the presence of two subscribing witnesses.

WILLIAM M. DICKINSON.

Witnesses:
WILLIAM F. BOOTH, Jr.,
D. B. RICHARDS.